United States Patent [19]

Bell et al.

[11] 4,099,800
[45] Jul. 11, 1978

[54] COORDINATE MEASURING MACHINE HAVING AUXILIARY AIR BEARING

[75] Inventors: Frederick Koonce Bell, Centerville; John Joseph Tuss, Englewood, both of Ohio

[73] Assignee: The Bendix Corporation, Southfield, Mich.

[21] Appl. No.: 800,668

[22] Filed: May 26, 1977

[51] Int. Cl.$^2$ .................. F16C 17/00; F16C 29/02
[52] U.S. Cl. .................. 308/6 R; 33/DIG. 2; 308/3 A; 308/DIG. 1
[58] Field of Search ........ 33/174 P, 174 PA, 174 PB, 33/174 TA, 174 D, 174 H, DIG. 2, 1 M, 174 L, 174 R; 308/6, 5, 3 R, 9, 3 A, DIG. 1, 15, 22, 3 CH, 1 R, 3.5, 35, 26

[56] References Cited

U.S. PATENT DOCUMENTS

| 3,377,111 | 4/1968 | Brault | 308/3 R |
| 3,384,970 | 5/1968 | Avalear | 33/DIG. 2 |

*Primary Examiner*—Trygve M. Blix
*Assistant Examiner*—Douglas C. Butler

*Attorney, Agent, or Firm*—Kenneth A. Seaman; Raymond J. Eifler

[57] ABSTRACT

An auxiliary air bearing system (50) for reducing friction in mechanical bearings (41, 42) to improve repeatability of measurements on a coordinate measuring machine (10). The air bearing system (50) and mechanical bearings (41, 42, 43) support a moveable carriage (30) on a base (20). The air bearing system (50) comprises an air pad assembly (70) mounted to the carriage (30), an air system (80) supplying air under pressure and a rail system (60) mounted to the base (20) with the air pad (70) including a compressed spring (76) captivated therein. Air under pressure is directed between the air pad assembly (70) and the rail system (60), causing the air pad assembly (70) to lift from the rail system (60) and the base (20). The air bearing system (50) and the spring (76) reduce the effect of any irregularities on the rail that would otherwise cause measurement errors. The air bearing system (50) is preferably mounted obliquely to two of the mechanical bearings (41, 42) so that a single air bearing assembly reduces the friction in the mechanical bearings supporting the carriage in two directions.

14 Claims, 5 Drawing Figures

U.S. Patent  July 11, 1978  Sheet 3 of 3  4,099,800
FIG. 3
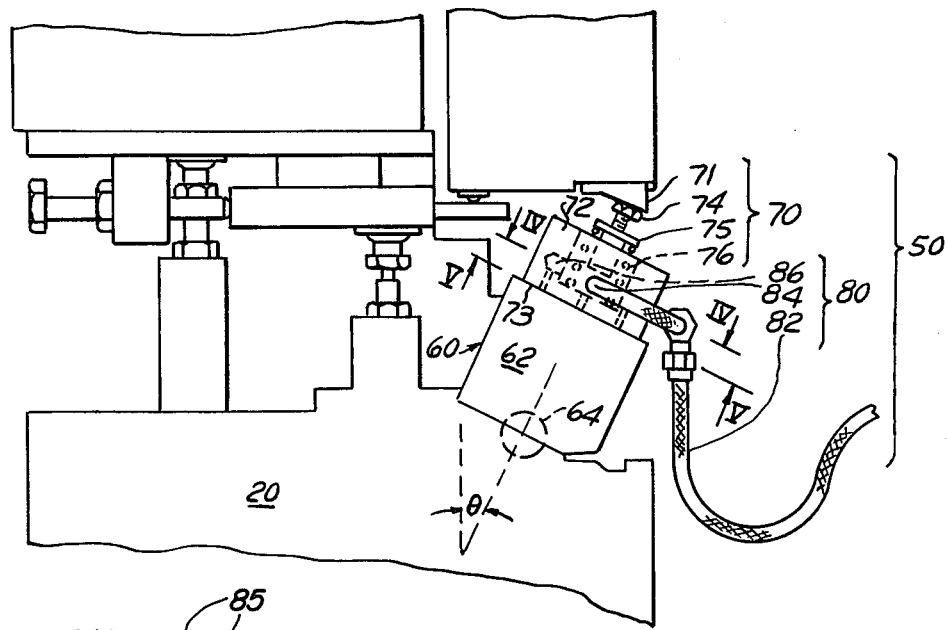
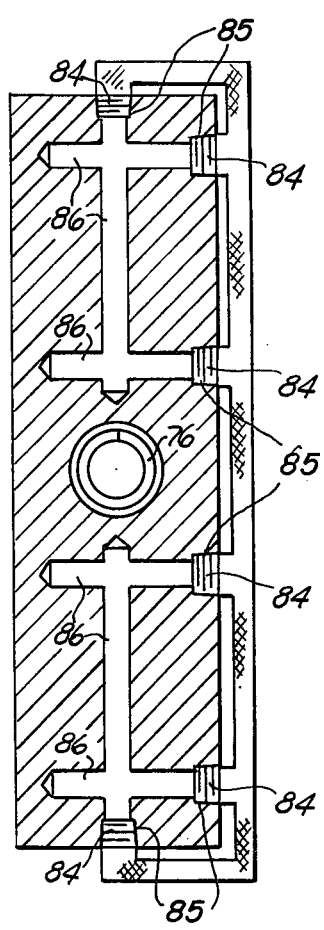
FIG. 4
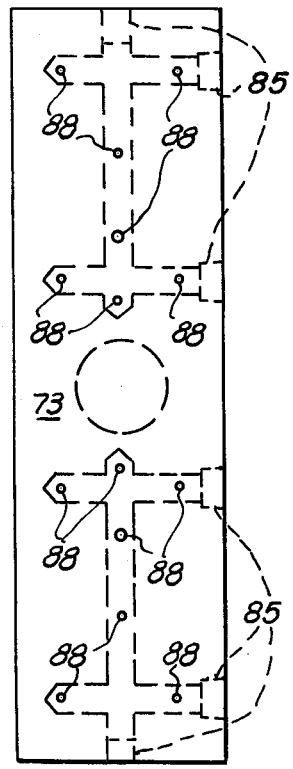
FIG. 5

COORDINATE MEASURING MACHINE HAVING AUXILIARY AIR BEARING

BACKGROUND OF INVENTION

1. Field of invention

The present invention relates to machines for measuring dimensions on machined parts. In particular, the invention is a system for reducing the friction in mechanical bearings on a coordinate measuring machine.

2. Description of prior art

Some coordinate measuring machines of prior designs have a moveable carriage mounted to a base. The carriage is exclusively supported in one of the orthogonal directions by a mechanical bearing or an air bearing.

Mechanical bearings have the disadvantage that some friction is inherent in the bearings and this friction is approximately proportional to the total load on the mechanical bearings. The prior systems which have a carriage exclusively supported in one direction by mechanical bearings have the disadvantage of the inherent friction.

Air bearings have been suggested for supporting completely the carriage in at least one direction. An air bearing system requires a rather wide air pad (to obtain the necessary lift) and an equally wide support for the air pad, generally in the form of a rail. The rail must be machined to highly precise dimensions and extend the measuring length of the machine. Because of the larger width of the precision straight rail (compared to the width of a rail for supporting a mechanical bearing) and the long length, the machining costs for producing such a rail are quite high.

The known prior art air bearing systems generally have a rigid coupling between the air bearing pad and the carriage of the measuring machine. This is disadvantageous, in that the bearings, which ride on a bearing surface, transmit every irregularity in the bearing surface to the measuring machine, causing measurement error.

SUMMARY OF THE INVENTION

The present invention overcomes the limitations of the prior art systems which have mechanical bearings exclusively supporting the carriage in one direction and those which use an air bearing to replace mechanical bearings in one or more of the support directions. The present system reduces the friction in the mechanical bearings and eliminates the necessity of a precisionally straight rail of large width.

The present invention is characterized by a mechanical bearing supplemented with an auxiliary air bearing assist. The air bearing assist preferably operates at an inclined angle with respect to the supporting directions of the mechanical bearings so that the air bearing assist operates to reduce forces acting on the mechanical bearings in two directions.

The present invention is also characterized by a yieldable coupling (a spring) between a portion of the air bearing and the measuring machine. The yieldable coupling allows the use of a less precise bearing surface without introducing large errors by absorbing some of the imperfections in the bearing surface.

The present invention contemplates a rail (62), mounted to the base (20) of the coordinate measuring machine (10) and an air pad assembly (70). The air bearing assist operates by directing air under pressure between assembly (70) and the rail (62) to provide an air cushion acting as an air bearing between the lower surface of the air pad assembly (70) and the rail (62). The carriage (30) is movable with respect to the base and the fixed rail, with reduced friction resulting from the air bearing.

The rail and the air pad are adjustably fixed to the base and carriage to allow for rotational movement relative to the base. The rotational movement allows the angle of the air pressure force, which is normal to rail surface, and spring force to be adjusted to one of the continuum of angles to allow a single air assist unit to reduce friction in more than one of the mechanical bearings as determined by static equilibrium analysis so that the total friction in the bearings can be minimized regardless of loading.

The above and other objects and features of the present invention will become apparent from the following detailed description taken in conjunction with the accompanying drawings and claims which form a part of this specification.

BRIEF DESCRIPTION OF THE DRAWINGS

FIG. 3 is a cut-away enlarged view of the measuring machine showing the structure of the air assist system.

FIG. 4 is a view of the air pad, taken along line 4—4 in FIG. 3 looking in the direction of the arrows.

FIG. 5 is a view of the lower surface of the air pad housing taken along line 5—5 in FIG. 3.

DETAILED DESCRIPTION OF THE DRAWINGS

Figure 1:
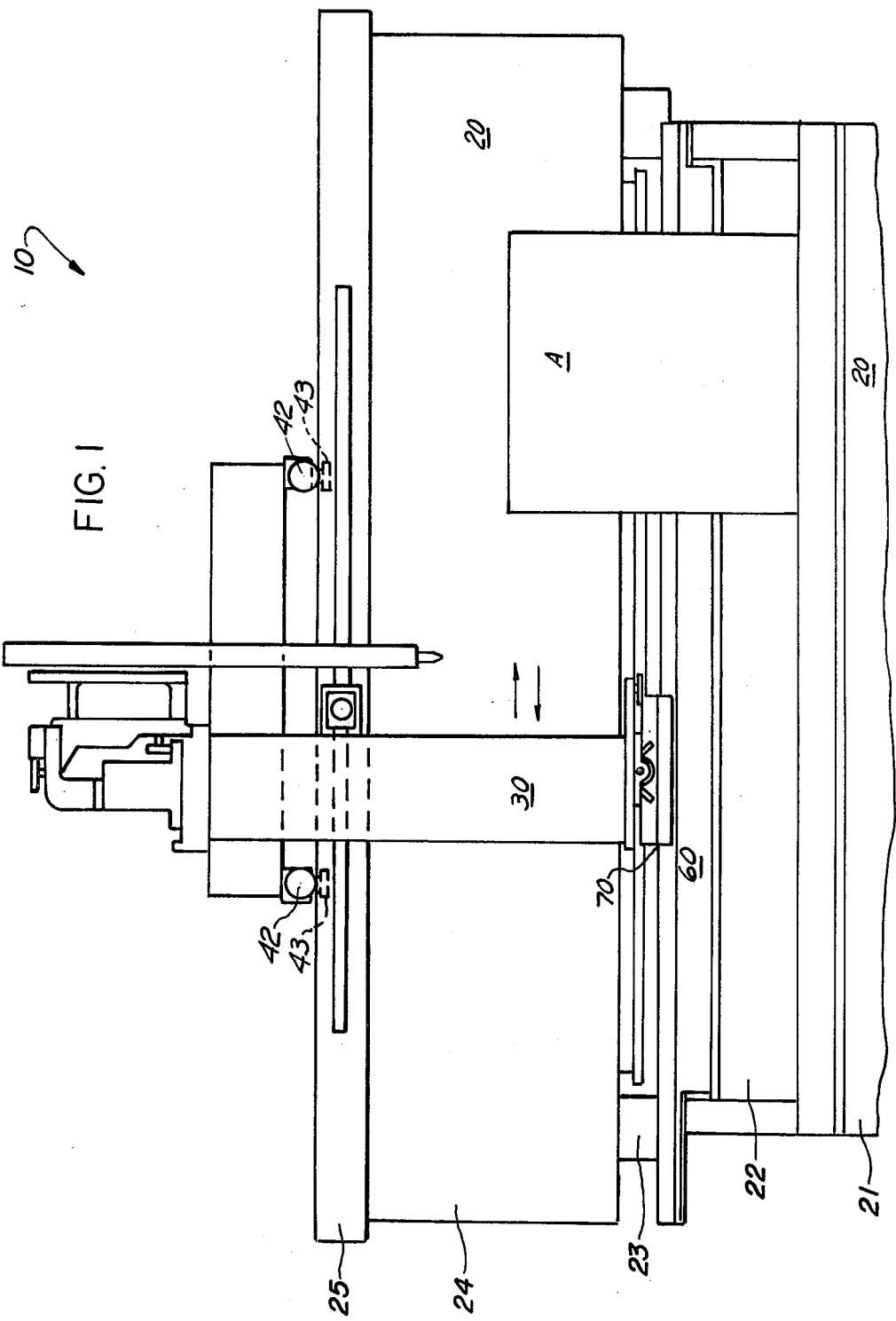
FIG. 1 is a front view of a coordinate measuring machine including the present invention.
Figure 2:
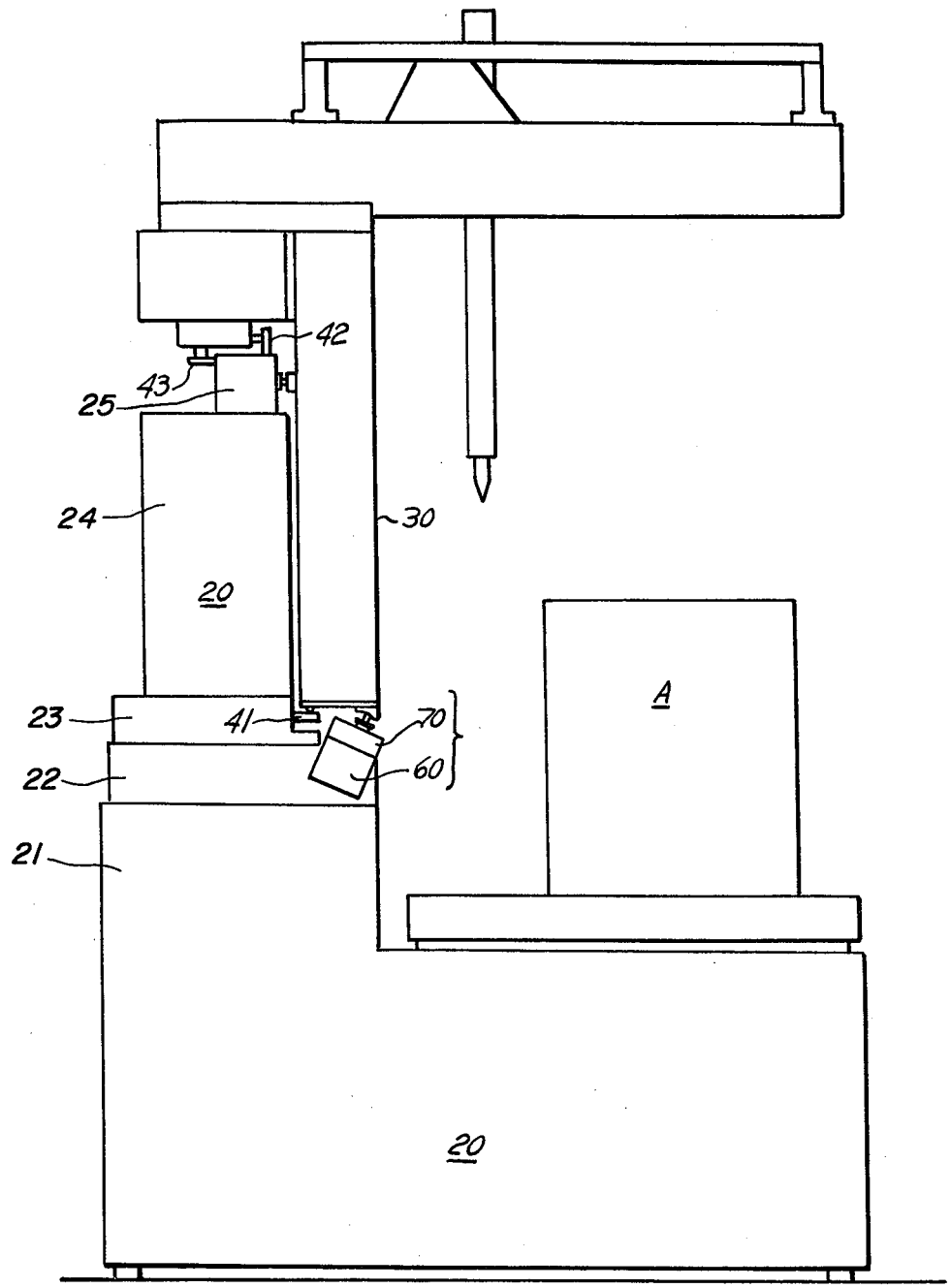
FIG. 2 is a side view of the coordinate measuring machine showing the present invention.

Referring now to the drawings, FIGS. 1 and 2 illustrate a coordinate measuring machine 10 employing the present invention for measuring dimensions on a part A. The coordinate measuring machine 10 includes a base 20 and a carriage 30 mounted to the base 20 to be movable in a first direction indicated by the arrows in FIG. 1. In its preferred embodiment, the carriage 30 is mounted to the base by a plurality of mechanical bearings 41, 42, 43 which are preferably ball bearings of high quality having low internal friction. These mechanical bearings 41, 42 and 43 support the carriage 20 in the two directions orthogonal to the first direction.

The base 20 includes portions 21, 22, 23, 24, 25 which collectively are referred to as the base 20.

The air bearing system 50 is also mounted between the carriage 30 and the base 20 for reducing the load on the mechanical bearings 41, 42.

The air bearing system 50 (also referred to as the air assist system) includes a rail system 60 mounted to the base 20 and an air pad assembly 70 mounted to the carriage 30.

The rail system 60 includes a rail 62 and a rotatable mounting 64. The rail 62 extends at least the usable length of the measuring machine in the first direction (the usable length of the measuring machine is understood to be the distance over which the carriage 30 is movable in the first direction). The rotatable mounting 64 fixes the lower portion of the rail 62 to the base for machine operation, at an angle $\theta$ from the vertical, the preferred orientation of the carriage 30. The rotatable mounting 64 is adjustable in a known manner to change the angle $\theta$ should a different angle be desired. Varying the angle $\theta$ varies the effective reduction of friction loading on the mechanical bearings 41, 42 which permit minimization of the total friction loading on the bearings.

Referring now to FIG. 3, the rail 62 of the present invention need only be machined to within a tolerance of 0.001 to 0.002 inches of straightness of the top surface. While this tolerance requires machining, this tolerance is far less precise and cheaper than tolerances generally required for air bearings, which typically require rail straightness to be within 0.0002 inches. Since the rail 62 is relatively long (typically 100 inches) and since the width for a precision rail is usually about 0.3 inches for a mechanical bearing and 2 inches for an air bearing, the high tolerances are difficult and costly to obtain.

The air pad assembly 70, as shown in FIGS. 3-5, is preferably associated with the carriage 30 and includes an adapter plate 71, a housing 72, having a lower surface 73, a jack screw 74, an adapter 75, and a spring 76.

The adapter plate 71 is fixedly mounted to the carriage 30 by screws and has an arcuate shape, said arc being a portion of the circle having the rotatable mounting 64 as its approximate center.

Spring 76 is mounted within a recess of the housing 72 and is held in place by the adapter 75 and the jack screw 74. The jack screw 74 is used to compress the spring 76, thereby creating a spring force directed outwardly from the spring 76.

Typically, the spring 76 is a coil spring which has a spring constant or spring rate (k) of about 1400 pounds per inch. Typically, in operation the spring is compressed approximately 0.18 inches, providing a spring force of 250 pounds.

Since the spring force is approximately equal to the force of the air under pressure, a spring force in the range of 100 to 400 pounds has been found most desirable. Exceeding this range has the disadvantage of requiring too large an air pad or too great an air pressure, or both. Using a spring force below this range does not provide an adequate absorption of the irregularities in the rail.

The air system 80 includes a source of air under pressure (not depicted), a flexible hose 82, and rigid couplings 84, each of which is mounted to an orifice 85 located on the air pad housing 72. The orifices 85 are coupled to internal air passage networks 86, which terminate in air apertures 88 extending through the lower surface 73 of the air pad assembly 70.

The air pressure source typically is under a pressure of about 60 pounds per square inch.

OPERATION

In operation, the air assist system 50 reduces mechanical friction in the mechanical bearings 41, 42. The air assist system operates in the following manner:

In preparation for using the machine 10 to measure a part A by moving the carriage 30, the jack screw 74 is rotatably positioned to compress the spring approximately 0.18 inch to provide a spring loading of approximately 250 pounds. The spring applies an outward force of 250 pounds on the air pad assembly 70 and the carriage 30 to reduce the radial load on mechanical bearings 41, 42 and thereby reduce the total mechanical bearing friction.

The source of air under pressure is then operatively coupled to discharge through the apertures 88 through the flexible hose 82, coupling 84 and internal air passage network 86. The discharge of air under pressure through the apertures 88 causes an air cushion to form between the lower surface 73 of air pad assembly 70 and the rail 62 of the rail system 60.

The lower surface 73 of the air pad assembly 70 lifts about 0.0005 inches above the rail 62, a dimension which is dependent on the air pressure applied and spring compression.

A deviation in the straightness, or height, of the rail 62 causes a reduced distortion in the carriage 30 because of the air assist system 50. A deviation of 0.001 inches in the rail causes a change in spring force of approximately 1.4 pounds or about 0.6% of the total spring force. Such a change of force applied to the carriage results in only minimal, if any, change in loading on the mechanical bearings, and thus does not affect the measurements. Furthermore, a portion of any change in force is absorbed in the air cushion to reduce the effect on the carriage.

While the preferred embodiment of the invention has been disclosed, it will be apparent to those skilled in the art that changes may be made to the invention as set forth in the appended claims and, in some cases, certain features of the present invention may be used to advantage without corresponding use of other features. For instance, the air pad could be mounted to the base, with a rail portion mounted to the carriage. Any gas could be used to provide the air cushion. Other forms of springs and biasing means could be used in place of the coil spring disclosed, so long as a yieldable connection exists between the bearing and the measuring machine. Accordingly, it is intended that the illustrative and descriptive materials herein be used to illustrate the principles of the invention, and not limit the scope thereof.

What is claimed is:

1. In combination with a measuring apparatus having a base, a carriage, means for mounting said carriage to said base for movement of the carriage relative to said base, said means including a plurality of bearings for supporting the carriage during movement, the improvement wherein at least one of said bearings for supporting said carriage is a bearing assembly comprising:

mechanical bearings means for supporting said carriage in a first direction and for allowing said carriage to move in a second direction; and air bearing means for supporting said carriage in the first direction and for allowing the carriage to move in the second direction said air bearing means including:

a rail mounted to one of said base and carriage and extending in said second direction; and a housing carried on the other of said carriage and said base, said housing having a plurality of passages connected together and each terminating in an aperture in a surface of said housing in contact with said rail, and means for receiving and directing air under pressure through said passages to direct air out of said apertures and between said surface of said housing and said rail for creating an air cushion and an air force therebetween, whereby the air cushion between said rail and said surface allows the movement of the carriage in said second direction relative to the base with reduced friction on the mechanical bearing means.

2. A measuring apparatus as described in claim 1 wherein the rail is mounted to said one of the base and carriage in an adjustable position, whereby the reduction in friction in mechanical bearings supporting the carriage in the first direction may be adjusted.

3. A measuring apparatus as described in claim 1 wherein the measuring apparatus includes additional mechanical bearings for supporting the carriage in a third direction and the mounting of the rail to one of said base or carriage is inclined with respect to said first and third directions, whereby said air force reduces the friction in the mechanical bearing means and the additional mechanical bearings.

4. A measuring apparatus as described in claim 3 wherein the rail is mounted at an angle at which the total friction in the mechanical bearings is minimized.

5. A measuring apparatus as described in claim 1 wherein the air bearing means further includes a spring under a compressive force mounted between said housing and said carriage for yieldably coupling the housing and the carriage, wherein the compressive force of the spring is approximately equal and opposite to the air force on said housing.

6. A measuring apparatus as described in claim 5 wherein the compressive force of the spring is in the range of 100 to 400 pounds.

7. A support system for a dimensional measuring machine comprising:
   a base;
   a carriage;
   a rail surface mounted to one of said base and carriage and extending in a first direction;
   a primary support system including a plurality of ball bearing assemblies for mounting said carriage to said base while allowing said carriage to be movable in the first direction with respect to said base, said ball bearing assemblies supporting said carriage on said base in two orthogonal directions which are each orthogonal to the first direction; and
   a secondary or auxiliary support system including:
      a housing mounted to the other of said base and said carriage, said housing having an orifice for receiving gas under pressure, a housing surface facing and in close proximity to said rail surface, said housing surface having a plurality of openings for the egress of gas therethrough and a gas passage for connecting the orifice with each of the openings, said gas passage allowing transmission of the pressurized gas from the orifice to the openings to provide an air cushion between and a gas force on the housing surface and the rail surface; and
      a spring element, a means for captivating under compression said spring element within the housing and between said housing surface and the other of said base and said carriage, whereby when the pressurized gas is applied to the orifice, the pressurized gas is directed to the openings in the housing surface creating an air cushion captivated between the rail surface and the housing surface, providing an air bearing therebetween, with the compression on the spring element approximately equaling the pressurized gas force, whereby the carriage may be moved in the first direction relative to the base over the air cushion and the force on the ball bearing assemblies is reduced by the auxiliary support system.

8. A support system as described in claim 7 wherein the plurality of ball bearing assemblies includes first and second ball bearings for supporting the carriage in the first and second orthogonal directions, respectively, and said auxiliary support system acts at an oblique angle to said first and second orthogonal directions, whereby the auxiliary support system reduces the friction in each of said first and second ball bearing assemblies.

9. A support system as described in claim 8 wherein the oblique angle is chosen so as to minimize the total friction in the plurality of ball bearing assemblies.

10. A support system as described in claim 7 wherein said spring element is a coil spring and the means for applying a compressive force is a screw rotatably mounted to the housing.

11. A support system as described in claim 7 wherein said spring is compressed to apply a force approximately equal to the force applied by the gas under pressure.

12. A method for improving repeatability in coordinate measuring apparatus by reducing the friction in mechanical bearings which mount a carriage to a base in the apparatus for relative movement therebetween, the steps of which method comprise:
   providing a housing having a passage leading from an inlet to a plurality of egress openings provided on a lower surface of the housing;
   mounting a rail to the base in proximity to the lower surface of the housing;
   mounting a biasing member between the housing and the carriage;
   applying a force to said biasing member for providing a repelling force between the housing and the carriage; and
   coupling a fluid under pressure to said inlet, whereby the fluid is transmitted through the passage to the plurality of openings on the lower surface of the housing to create a fluid force and a fluid cushion between the lower surface and the rail, said fluid force being approximately equal to the force of the biasing member, whereby the air cushion and biasing member reduce the friction in the mechanical bearings.

13. In combination with a measuring apparatus having a base, a carriage, means for mounting said carriage to said base for movement of the carriage relative to said base, said means including a plurality of bearing for supporting the carriage during movement, the improvement wherein at least one of said bearings for supporting said carriage is a bearing assembly comprising:
   mechanical bearings means for supporting said carriage in a first direction and a third direction and for allowing said carriage to move in a second direction; and
   air bearing means for supporting said carriage in the first direction and for allowing the carriage to move in the second direction, said air bearing means including:
      a rail mounted to one of said base at an adjustable incline with respect to said first and third directions and extending in said second direction; and
      a housing carried on the other of said carriage and said base, said housing having a plurality of passages connected together and each terminating in an aperture in a surface of said housing in contact with said rail, and means for receiving and directing air under pressure to said passages to direct air of said apertures and between said surface of said rail for creating an air cushion and an air force therebetween, whereby the air cushion between said rail and said surface allows the movement of the carriage in said second direction relative to the base with reduced friction on the mechanical bearing means which support the carriage in the first and third directions.

14. A measuring apparatus as described in claim 13 wherein the rail is mounted at an angle at which the total friction in the mechanical bearing is minimized.

* * * * *